Jan. 2, 1968 E. M. MASSELL ET AL 3,361,899

READOUT SYSTEM

Filed June 29, 1964 4 Sheets-Sheet 1

INVENTORS
EDWARD M. MASSELL
DAVID H. KEENE

BY Allan Ratner

READOUT SYSTEM

Filed June 29, 1964 4 Sheets-Sheet 2

INVENTORS
EDWARD M. MASSELL
DAVID H. KEENE

BY Allan Ratner

INVENTORS
EDWARD M. MASSELL
DAVID H. KEENE
BY Allan Ratner

*INVENTORS*
EDWARD M. MASSELL
DAVID H. KEENE

BY Allan Ratner

United States Patent Office 3,361,899
Patented Jan. 2, 1968

3,361,899
READOUT SYSTEM

Edward M. Massell, Red Bank, and David H. Keene, West Long Branch, N.J., assignors to Electronic Associates Inc., Long Branch, N.J., a corporation of New Jersey
Filed June 29, 1964, Ser. No. 378,556
13 Claims. (Cl. 235—194)

ABSTRACT OF THE DISCLOSURE

A single readout means is provided in an analog computer for selective connection to individual ones of a plurality of current output analog computing elements that are interconnected in accordance with a given scheme or program. Switch means are provided for direct connection between each current output computing element and the next succeeding element in the circuit during normal operation and to connect a particular selected current output element directly to the input of the readout means when readout is desired. The readout means includes a first amplifier to provide as one output a voltage proportional to the applied input current and a second amplifier to provide as a second output a current similar in direction and magnitude as the input current which output current is directly conducted by the switch means to the input of the next succeeding computing element so that an appropriate voltage is provided for readout without changing the condition of the other computing elements in the circuit.

Figure 1A:
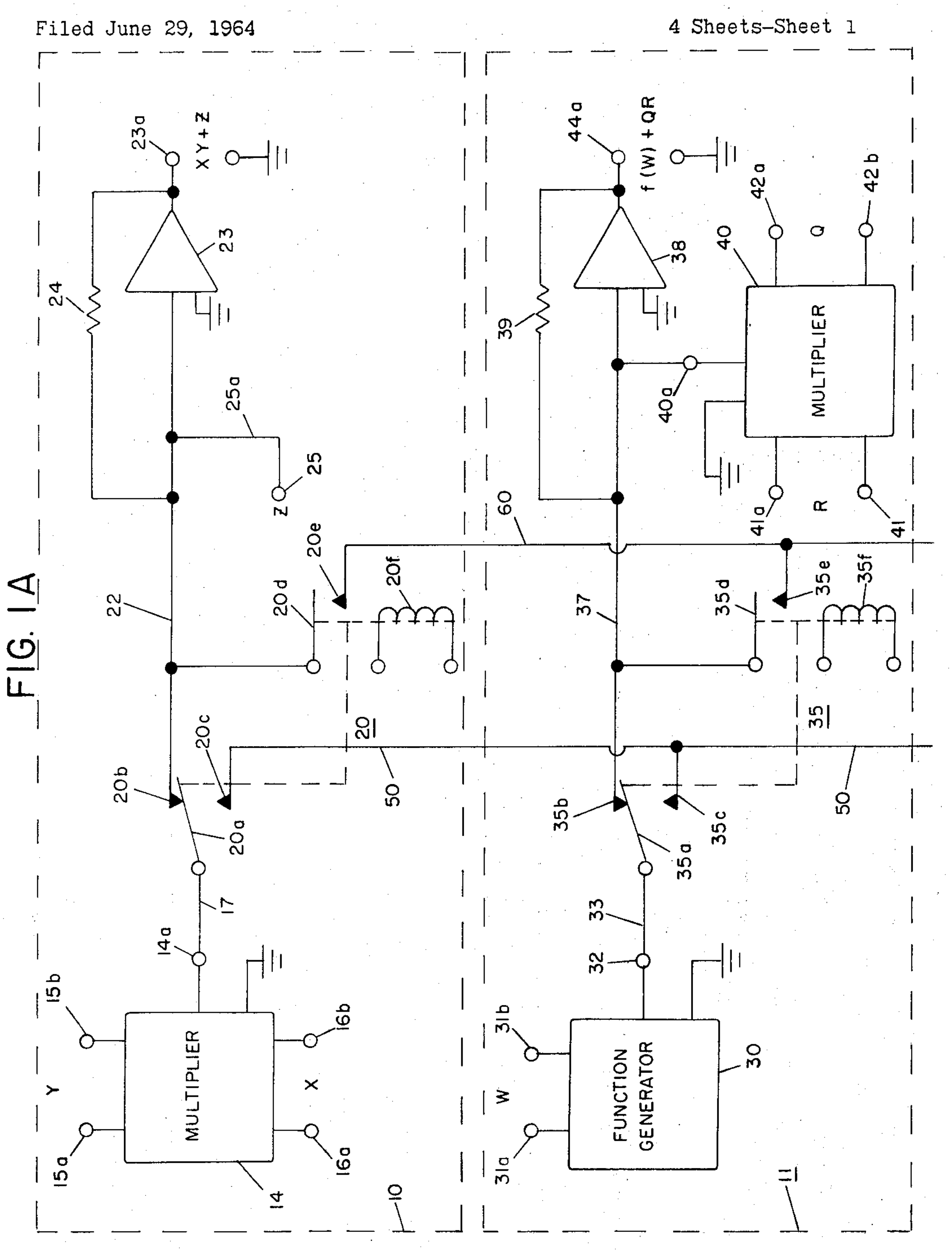

This invention relates to electronic analog computing apparatus, and more particularly to providing voltage readout from current output devices.

An analog computer may be used to simulate a dynamic system problem since selected analog computing elements obey laws similar to the fundamental laws which govern such dynamic systems. In solving a problem the dynamic system is first described by mathematical equations. The equations may be used to define a program which is a graphic analog of the equations and shows the manner in which the different computing elements should be interconnected. With the computing elements interconnected in accordance with the program they simulate the behavior of the dynamic system.

After the computing elements have been interconnected to form closed or open loops, the computer operator may operate the computer and at various times during the computation put the computer into its different modes, such as Check, Operate, Hold or Initial Condition. For example, in the Hold mode, the operator may wish to read out the results being held by the various computing elements without disturbing the condition or the solution of the computer. These results may be read out from the output of particular desired computing elements by selectively connecting to particular elements having a voltage output, a voltage readout device such as a digital voltmeter. In this manner, the voltmeter is connected to an output terminal of the desired computing element and the voltage readout represents a result in accordance with the equations. These results are required to be read without disturbing the interconnected computing elements in any way or the voltages being held by the various elements would be changed or destroyed, thus producing inaccurate or false results. In addition, the readout procedure may be utilized in the Initial Condition mode as for example to check at the beginning of a solution of a problem or to "troubleshoot" the interconnected computing elements to determine if they have been correctly connected and are operative in the program.

Many computing elements provide an output signal in the form of a varying current, while the output voltage remains substantially zero. Such "current output" computing element may be for example multipliers and function-generators, both of which normally feed into a summing junction of an operational amplifier, as described for example in "Design Fundamentals of Analog Computers" by R. M. Howe, D. Van Nostrand, 1961, at pages 175 et. seq. and 187 et. seq. The amplifier is effective in converting the output of the current output computing element to a proportional varying voltage. It is only this varying voltage output which may be applied to a voltage readout device.

The operational amplifier to which the current output element feeds may not provide a proportional voltage when other elements also feed into that operational amplifier. In many programs it very often occurs that a plurality of current output elements feed into a single amplifier.

Thus, the output of that operational amplifier will not provide a voltage which is proportional to the current produced by any one current output computing element. In the many cases where a proportional voltage is not available a common, but not very satisfactory solution has been to use an extra assigned operational amplifier for each of the current output computing elements. The sole purpose of these extra amplifiers is to provide a voltage output to be used for readout purposes. If the program requires many current output computing elements, then a like number of extra relatively expensive operational amplifiers may also be required. In this manner, such programs require analog computers having sufficient extra amplifiers to meet this need which substantially increases the cost and size of a general purpose analog computer without adding to its capabilities. For example, an analog computer may include thirty multipliers and seventy-five function-generators making a total of these current output computing elements of one hundred and five which may necessitate a substantially similar number of extra operational amplifiers solely for the purpose of voltage readout.

Accordingly, an object of the present invention is a readout system utilizing but a single amplifying means to provide a voltage readout for each current output computing element and which may be selectively connected to each such computing element without disturbing the condition of the computer.

In accordance with the invention, there is provided a single readout means selectively connected between a desired current output computing element and the next succeeding computing element in the program without disturbing the condition of the computer to provide voltage readouts of value proportional to the current output of each of the current output computing elements.

In carrying out the invention in one form thereof individual switch means may be connected between each current output computing element and the next succeeding element in the program. During normal operation of the computer each switching means normally directly connects the output of its respective current output computing element to the input of the next succeeding element. When it is desired to read out the results of the computing elements, the computer is put in its Hold mode for example and a selected switch means may be actuated to apply the output of a desired current output computing element directly to the input of the readout means. The readout means provides a voltage proportional to the applied current for application to a readout device. In addition, the readout means produces a current output similar in direction and magnitude to the applied current, which is directly conducted by way of the selected switch means to the input of the next succeeding computing element. In this manner, the output of each current output computing element may be read out as desired without changing the condition held by the computing elements. It will be understood that such readouts may be taken when the computer is in modes other than Hold, such as the Initial Condition mode, without disturbing the interconnected elements.

In a preferred form of the invention, the readout means comprises a two stage device including a first stage operational amplifier, the voltage output of which is applied to a voltage readout device, and a second stage amplifier for inverting the voltage output of the first stage amplifier. The inverted signal is conducted through a resistor for producing a current identical in magnitude and direction to the current initially applied to the first stage amplifier. Thus, in accordance with the present invention only two amplifiers are required to provide voltage readout for all of the current output computing elements of the computer in contrast to the prior necessity of an extra amplifier for each such element which was summed with others at the input to an amplifier.

Figures 1B, 1C:
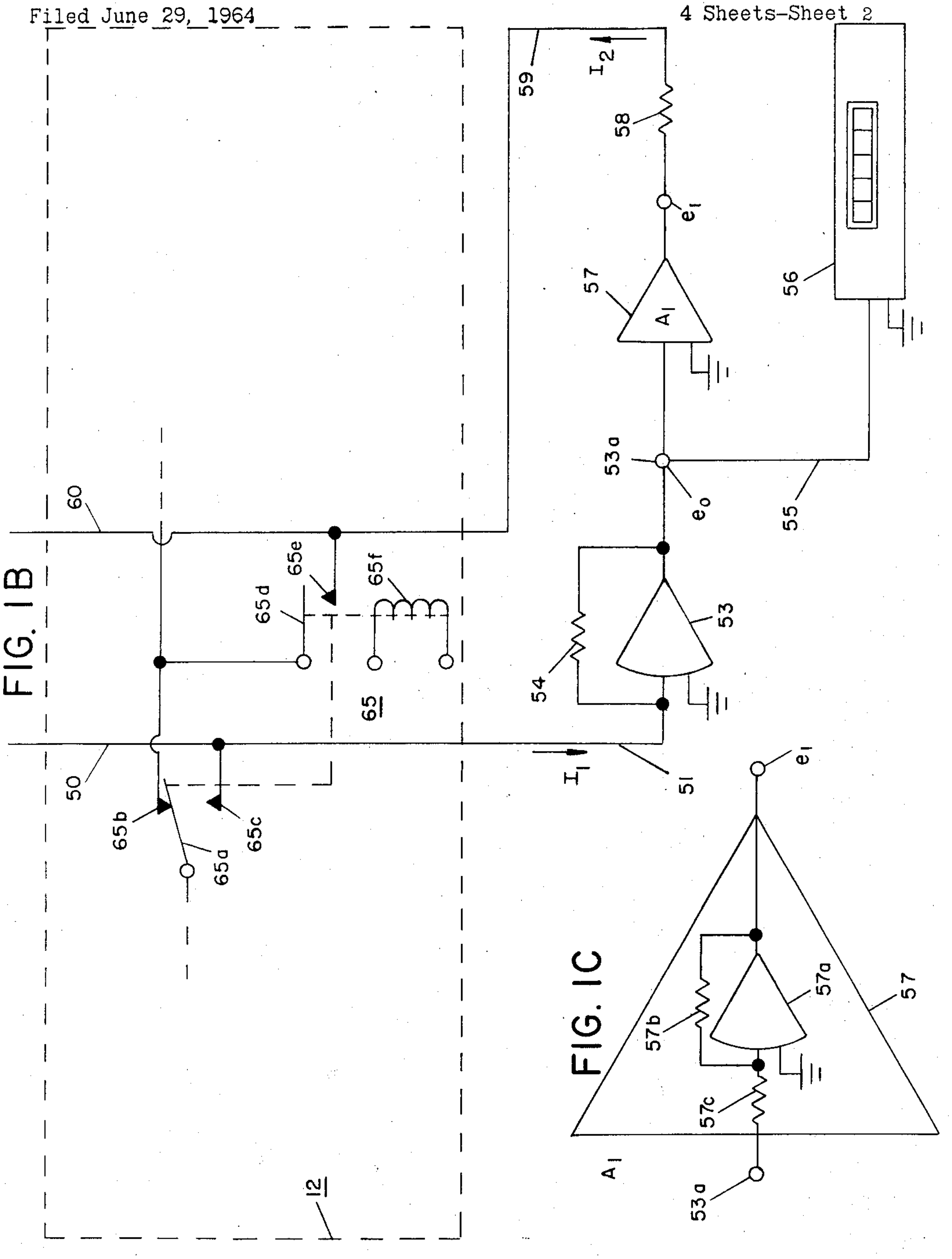
Figure 2:
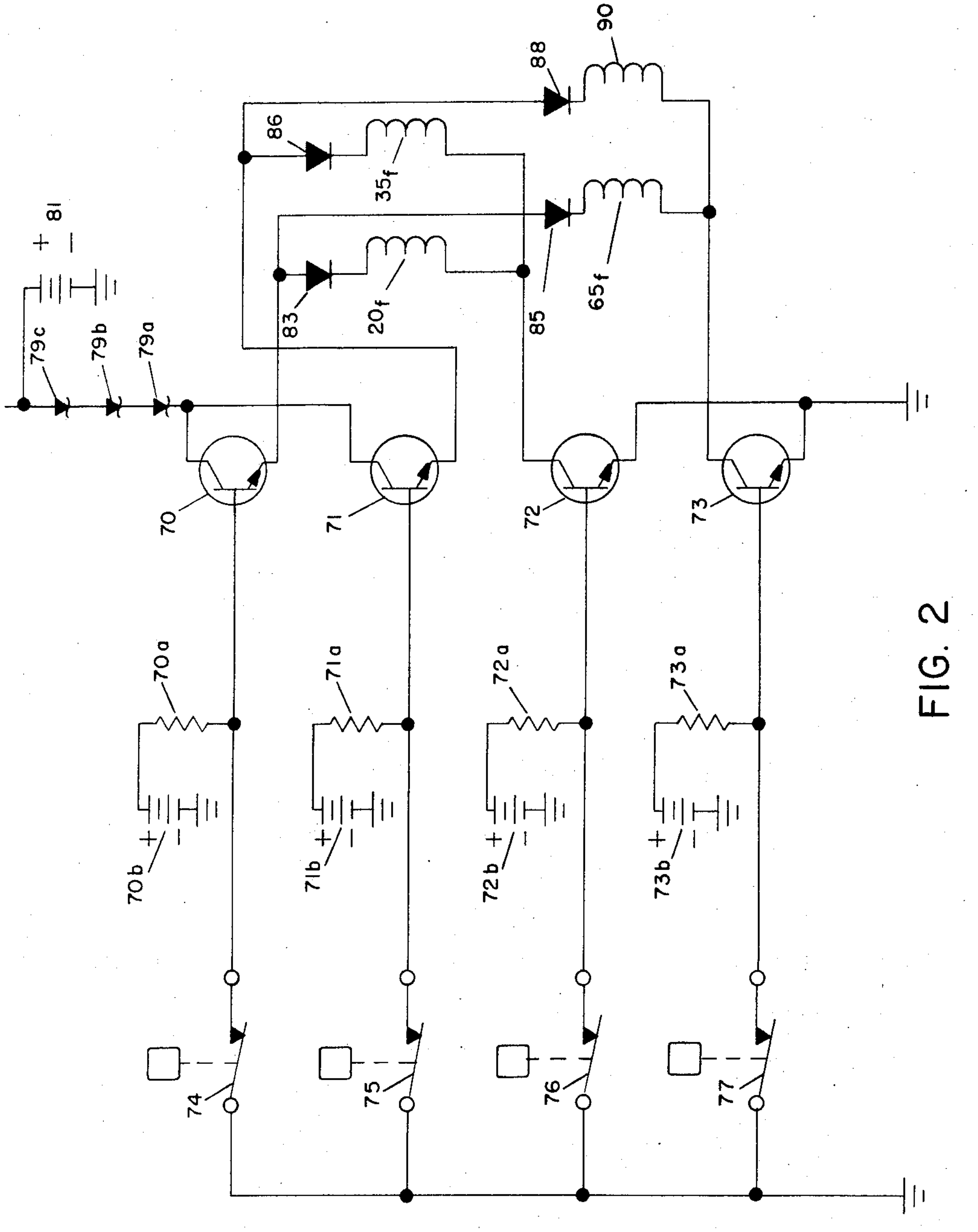
Figure 3:
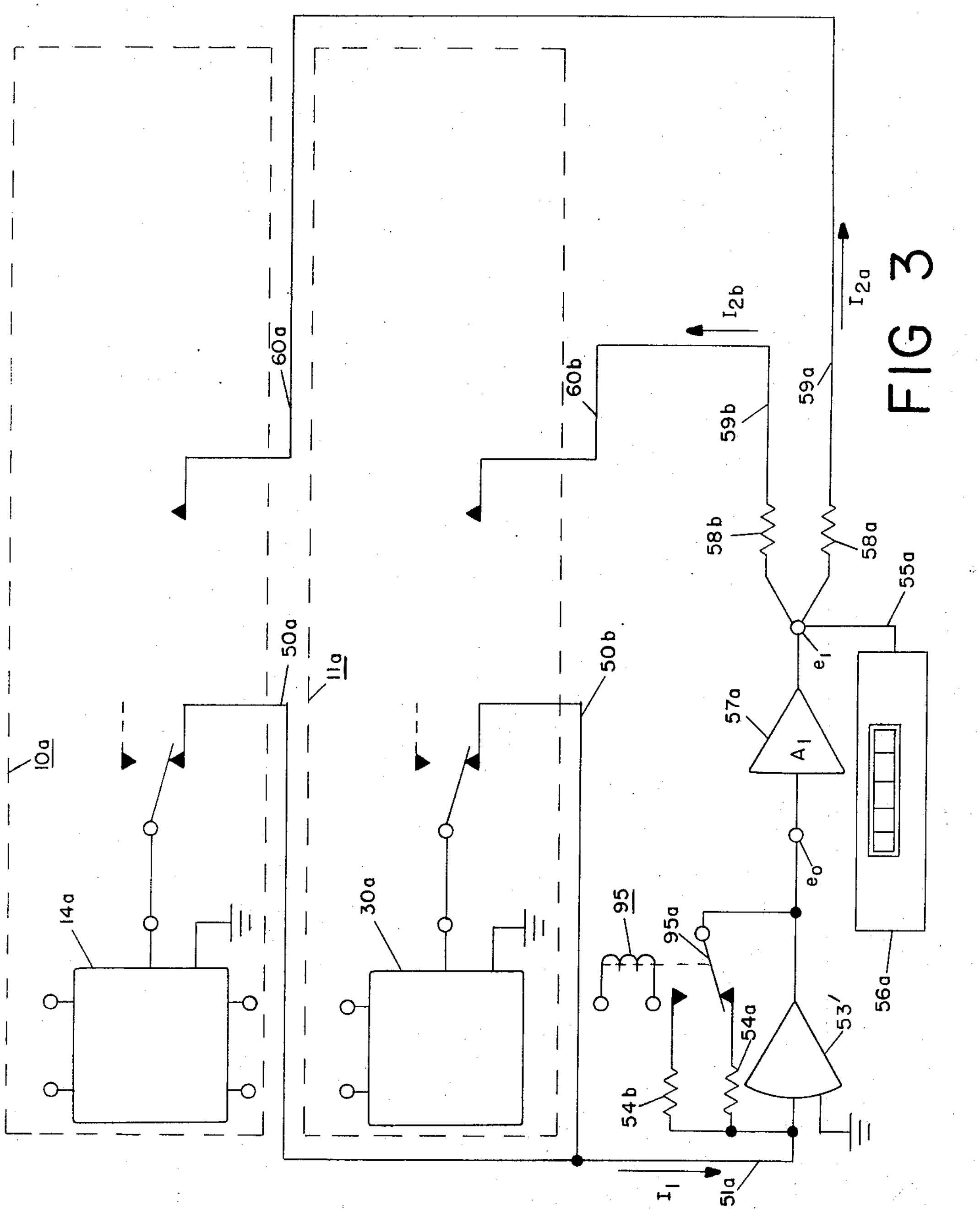

For further objects and advantages of the invention and for a description of its operation, reference is to be had to the following detailed description taken in conjunction with the accompanying drawings in which:

FIGS. 1A and 1B taken together schematically illustrate a readout system embodying the invention;

FIG. 1C schematically illustrates an amplifier system shown in FIG. 1B;

FIG. 2 schematically illustrates the switching system for operating the relays shown in FIG. 1; and FIG. 3 is a modification of the present invention providing for different scale factors of the current output computing elements.

Referring now to FIGS. 1A and 1B there are shown two sections, 10–12, of a computer program, each of which sections comprise a plurality of computing elements. It will be understood that a selected computer program may comprise a plurality of such sections with each section including at least one computing element. The computing elements are interconnected one with the other in accordance with the program to simulate the behavior of a dynamic system. The elements may be connected in open or closed loops as required by the selected program.

The program section 10 includes a multiplier 14 having a variable signal Y applied to its input terminals 15*a* and 15*b* and a variable signal X applied to its input terminals 16*a* and 16*b*. The multiplier 14 is effective to multiply the variable Y by the variable X the resultant of which is applied by way of output terminal 14*a* and conductor 17 to a contact arm 20*a* of a relay 20. As illustrated, arm 20*a* is in its normal position connected to contact 20*b* for completing a circuit by way of conductor 17, arm 20*a*, contact 20*b*, conductor 22 to the input of an operational amplifier 23. High gain operational amplifier 23 may be of the type described in Patent No. 3,081,435 with a feedback resistor 24 connected between its output and its input.

An additional variable Z may be applied to the input of amplifier 23 by way of terminal 25 and conductor 25*a*. It will be understood by those skilled in the art that section 10 produces a signal at output terminal 23*a* in accordance with the following relation:

$$XY+Z$$

Thus, the output of section 10 has a voltage proportional to the multiplication of the variables X and Y plus the addition of a variable Z. In this way the voltage output of amplifier 23 is not proportional to the current output of multiplier 14. In prior systems a voltage output proportional to that current could only be obtained by adding an extra operational amplifier between the current output computing element 14 and its next succeeding stage, viz computer element 23.

A similar situation is encountered in program section 11 in which there is provided a function generator 30 having a variable W applied to its input terminals 31*a* and 31*b*. Thus, there is produced at the output terminal 32 a function of the variable W which is applied by way of conductor 33 to an arm 35*a* of a relay 35. As illustrated, arm 35*a* is in its normal position connected to contact 35*b* so that the current output of function generator 30 is applied by way of terminal 32, conductor 33, arm 35*a*, contact 35*b* and conductor 37 to the input of an operational amplifier 38, having a feedback resistor 39 connected between its output and its input.

In addition, a multiplier 40 has its output terminal 40*a* connected to the input of amplifier 38. Multiplier 40 has applied to its input terminals 41*a* and 41*b* the variable R and the variable Q is applied to its input terminals 42*a* and 42*b*. In this manner the multiplication of the variable R and the variable Q are applied as an input to the operational amplifier 38 so that there is produced at its output terminals 44*a* a signal corresponding to the function of W plus the multiplication of Q and R. It will be seen that in section 11 and similarly in section 10, the amplifier next succeeding the function generator 30 does not produce a voltage output proportional to the current output of that generator. If such a proportional voltage readout was desired in the prior circuits then an additional assigned operational amplifier would have been required to be connected between the output of the generator 30 and the amplifier 38.

In accordance with the present invention there is provided readout or amplifier means selectively connected in circuit with each current output computing element. Specifically when the operating coil 20*f* of relay 20 is energized by an energization circuit which will later be described in detail, arm 20*a* engages contact 20*c* and arm 20*d* engages contact 20*e*. Thus a circuit is completed from the current output element or multiplier 14 by way of its output terminal 14*a*, arm 20*a*, contact 20*c*, conductors 50 and 51 to the input of an operational amplifier 53. The first stage of that amplifier is selected to provide a high impedance to the output of multiplier 14 and there is provided a feedback resistor 54 connected between the output and the input of amplifier 53. With the applied current $I_1$ to amplifier 53 in the direction indicated by the arrow, there is produced at output terminal 53*a* of amplifier 53 a potential $e_0$ proportional to the applied current $I_1$. That potential is applied by way of conductor 55 to a voltage readout device 56 which may be a conventional digital voltmeter which digitally indicates the voltage appearing at terminal 53*a*.

Terminal 53*a* is connected to an input of an operational amplifier system 57 which produces an output potential $e_1$ which is reversed in direction with respect to potential $e_0$. The amplifier system 57 provides a voltage amplification $A_1$, is shown in more detail in FIG. 1C and comprises a high gain amplifier 57*a*, a feedback resistor 57*b* and an input resistor 57*c*. Potential $e_1$ is applied by way of a resistor 58 to conductor 59 to produce a current flow $I_2$ through that conductor. As a result of the reversal of direction of the signal by both amplifier 53 and by amplifier 57 it will be understood that the current $I_2$ is in the same phase and direction as current $I_1$.

In accordance with the invention the foregoing amplifiers and resistors are selected so that current $I_2$ is also equal in magnitude to the current $I_1$. The foregoing may be achieved for example if the voltage amplification $A_1$ of amplifier 57 is selected to be unity and if the value of resistor 54 ($R_1$) is equal in magnitude to the value of resistor 58 ($R_2$). The mathematics of the foregoing may be seen since $$A_1=1 \tag{1}$$

$$e_1=e_0 \tag{2}$$

It is well known in the art that the output voltage $e_0$ of an operational amplifier 53 may be represented as $$e_0=I_1R_1 \tag{3}$$

and the current $I_2$ may be represented as $$I_2=\frac{e_1}{R_2} \tag{4}$$

Substituting Equation 2:

$$I_2=\frac{-e_0}{R_2} \tag{5}$$

Solving and rearranging:

$$I_2=\frac{I_1R_1}{R_2} \tag{6}$$

and since $$R_1=R_2 \tag{7}$$

then $$I_2=I_1 \tag{8}$$

which is the desired result.

It may be desired that amplifier 57 provide a value voltage amplification other than unity. Thus the circuit elements may be selected in the following manner to again achieve the result of current $I_2$ being equal to $I_1$.

$$A_1=\frac{-e_1}{e_0} \tag{9}$$

$$e_1=-A_1e_0 \tag{10}$$

Combining Equations 6 and 10:

$$I_2=\frac{-A_1e_0}{R_2} \tag{11}$$

Substituting Equation 3:

$$I_2=\frac{A_1I_1R_1}{R_2} \tag{12}$$

or $$I_2=I_1\left(A_1\frac{R_1}{R_2}\right) \tag{13}$$

It will now be understood that the values of $A_1$, $R_1$ and $R_2$ may be selected so that $$A_1\frac{R_1}{R_2}=1 \tag{14}$$

and thus current $L_2$ equals the current $I_1$. As known by those skilled in the art, the amplifier 57 as shown in FIG. 1C has a voltage amplification $A_1$ equal to $R_3/R_4$ where feedback resistor **57*b* is $R_3$ and input resistor 57*c*** is $R_4$. Substituting in Equation 14:

$$\frac{R_1R_3}{R_2R_4}=1 \tag{15}$$

to provide a current $I_2$ equaling the current $I_1$.

Current $I_1$ is conducted by lead 59 and 60 to contact **20*e*, arm 20*d*, and conductor 22 to the input and summing junction of amplifier 23. Thus, with operating coil of relay 20 energized, the varying current produced by the multiplier 14 is applied to amplifier 53 which produces a potential at terminal 53*a* proportional to that current. In this manner the readout device 56 provides a voltage readout proportional to the varying current. The foregoing potential is then reconverted back to a varying current identical in magnitude and direction to the output of multiplier 14 which current is applied by way of conductors 59 and 60 and 22 to the amplifier 23. In this manner with the computer in its Hold mode, for example, and with the relay 20 energized the output of multiplier 14** may be read out without disturbing the condition or solution of the computer and without the necessity of an extra operational amplifier.

In similar manner, the operating coil of relay 35 may be energized to operate the arm **35*a* and the arm 35*d* to complete a circuit from the output of function generator 30 by way of its output terminal 32, conductor 33, arm 35*a*, contact 35*c*, conductors 50 and 51 to the input of amplifier 53. As a result, the readout device 56 will provide a readout proportional to the current output from the computing element 30. There will be produced from amplifier 57 and resistor 58 an identical current which flows by way of conductor 59 and 60, contact 35*e*, arm 35*d*, and the conductor 37 to the input of amplifier 38. In this manner, with the computer in its Hold mode, the current output of the function generator 30 may be read out by the device 56** without disturbing the condition of the computer.

It will be understood that the outputs of a plurality of other current output computing elements may be read out in accordance with the invention. For example, in section 12 the output of an additional current output computing element (not shown) may be selectively connected by way of a relay 65 to the input of amplifier 53 and then to the voltage readout device 56. The foregoing voltage is then converted back to a varying current identical in magnitude and direction to the input of amplifier 53 and then applied by way of conductor 59, contact **65*e*, arm 65*d*, to an input of the next succeeding stage (not shown) of section 12**.

It will now be understood that in accordance with the invention each of the relays 20, 35 and 65 are selectively actuated for readout of the desired current output computing element. The manner in which the operating coils **20*f*, 35*f* and 65*f*** are selectively energized to actuate their respective relays will now be described.

Referring now to FIG. 2 there are shown an energization circuit for the operating coils **20*f*, 35*f* and 65*f* of relays 20, 35 and 65 respectively. The remaining portions of the respective relays are not shown to simplify the description. In order to provide for energization of these operating coils there are provided four NPN transistors 70–73. These transistors are maintained normally nonconductive for the reason that the base of each is connected by way of a respective switch 74–77 to a point of reference potential, such as ground potential. In addition, the bases of transistors 70–73 are connected respectively by way of resistors 70*a*, 71*a*, 72*a*, 73*a* to the positive side of supply batteries 70*b*, 71*b*, 72*b*, 73*b*. The negative side of each of the batteries is connected to ground. Thus, it will be understood by those skilled in the art that if, for example, switch 74 is operated to its open position, the base of transistor 70 will no longer be connected to ground and the positive potential of battery 70*b* is effective by way of resistor 70*a* to render transistor 70** conductive.

The collectors of transistors 70 and 71 are connected together and by way of diodes **79*a*, 79*b*, 79*c* to the positive side of a supply battery 81, the negative side of which is connected to ground. The emitter of transistor 70 is connected (1) by way of a diode 83 to one end of a coil 20*f* and (2) by way of diode 85 to one end of coil 65*f*. The emitter of transistor 71 is connected (1) by way of diode 86 to one end of coil 35*f* and (2) by way of diode 88 to one end of a coil 90** (not utilized in FIG. 1).

In operation of the energization circuit of FIG. 2 to energize coil **20*f*, switches 74 and 76 are opened. Thus, transistors 70 and 72 are rendered conductive and a circuit is completed for current flow by way of battery 81, diodes 79*a*–79*c*, conductive transistor 70, diode 83, coil 20*f*, conductive transistor 72 and then to ground. In similar manner in order to energize coil 65*f*, switches 74 and 77 are open thereby to render conductive transistors 70 and 73. Thus, a circuit is completed for current flow by way of battery 81, diodes 79*a*–79*c*, conductive transistor 70, diode 85, coil 65*f*, conductive transistor 73 to ground It will now be understood that coil 35*f* may be energized by opening switches 75 and 76 for flow of current through conductive transistor 71, diode 86, coil 35*f*, conductive transistor 72 to ground. For coil 90 switches 75 and 77 are opened and a circuit may be traced by way of conductive transistor 71, diode 88, coil 90, conductive transistor 73** to ground.

As described above, each of the operating coils for the relays may be selectively energized by opening two of the four switches. Thus, four switches are used to control the energization of four coils. It will be understood by those skilled in the art that many more coils may be energized by the addition of the same number of switches and the necessary transistors and related circuits.

Now that the principles of the invention have been explained it will be understood that many modifications may be made. For example, as shown in FIG. 3 the readout means is adapted to provide different scaling factors for different current output computing elements. The various elements in FIG. 3 correspond with those of FIGS. 1A–1C and therefore have been identified by corresponding reference characters plus a suffix.

As understood by those skilled in the art multiplier 14*a* of program section 10*a* may be designed to feed into an amplifier 53' having a predetermined feedback resistor 54*a* having a value of one hundred kilohms, for example. In this way the full scale voltage range of the digital voltmeter 56*a* may be utilized. On the other hand, the function generator 30*a* may be designed to feed into an amplifier 53' having, for example, a one megohm feedback resistor 54*b* in order to obtain the full scale voltage range.

In order to provide for such differing "scale factors," an arm 95*a* of a relay 95 is connected to the output of amplifier 53' and may be shifted to complete a circuit either with feedback resistor 54*b* or with feedback resistor 54*a*.

Amplifier 57*a* is connected (1) by way of resistor 58*a* and conductors 59*a* and 60*a* back to section 10*a* and (2) by way of resistor 58*b* and conductors 59*b* and 60*b* to section 10*b*. Resistor 58*a* may be selected to have a resistance value identical to resistor 54*a* so that when the output of multiplier 14*a* is being read out and feedback resistor 54*a* is being used, the current $I_{2a}$ will be equal in magnitude to the current $I_1$. In similar manner, the resistor 58*b* may be selected to be identical to resistor 54*b*. Thus, when the function generator 30*a* is being read out and feedback resistor 54*b* is being used then current $I_{2b}$ will be equal in magnitude to the applied current $I_1$.

In FIG. 3 the voltage readout device 56*a* is shown as being connected to read the voltage $e_1$ rather than the voltage $e_0$ as is the case in FIGS. 1A–1B. With the conditions assumed in Equation 2, $e_1=-e_0$, device 56*a* indicates the same magnitude of voltage in either connection but of different polarity. It will also be understood that the feedback resistors 54*a* and 54*b* and series resistors 58*a* and 58*b* may have values other than described above, but in accordance with above described Equations 9–15.

What is claimed is:

1. An analog computing system including a plurality of computing elements capable of being interconnected in accordance with a desired program, at least one of said computing elements being a current output computing element, and selected means for interconnecting selected ones of said computing elements, said system comprising:

switch means included in said selected interconnecting means for normally connecting an output of said current output computing element to the next succeeding element, readout means for producing from an applied current a proportional voltage and for providing at an output a current equal in magnitude and direction to said applied current, and means for operating said switch means to connect said output of said current output computing element to said readout means and to connect said output of said readout means to said next succeeding element for producing a readout voltage proportional to said applied current without changing the condition of said computing elements.

2. The analog computer system of claim 1 in which said switch means comprises a first relay arm normally connecting said current output computing element and the next succeeding stage in said program, and in which there is provided (1) a second relay arm and a first contact for connecting the output of said readout means to said input of said next succeeding element and (2) a second contact for connecting the output of said current output computing element to said readout means, upon operation of said switch means.

3. The analog computer system of claim 1 in which said switch means includes a relay having an operating coil for each current output computing element and in which there is provided means for connecting a first switchable element to one side of each operating coil and a second switchable element to the other side of each operating coil whereby each operating coil may be selectively energized when the switchable elements connected to the ends thereof are turned ON.

4. The analog computer system of claim 1 in which said switch means includes a relay having an operating coil for each current output computing element and in which there is provided means for connecting a first semiconductor device to one side of each operating coil and a second semiconductor device to the other side of each operating coil, and means for switching the conductivity states of said semiconductor devices whereby an operating coil is energized when the semiconductor devices connected to the ends thereof are switched to their conductive state.

5. The analog computer system of claim 1 in which said readout means comprises first amplifier means for producing from said applied current a proportional voltage and second amplifier means for producing from said proportional voltage a current equal in magnitude and direction to said applied current.

6. The analog computer system of claim 5 in which said first amplifier means comprises a first amplifier having a feedback resistor connected between its output and input and in which said second amplifier means comprises a second amplifier having a series resistor connected in circuit with the output thereof, and said second amplifier having a value of voltage amplification which multiplied by the resistance value of said feedback resistor and divided by the resistance value of said series resistor equals unity.

7. The analog computer system of claim 5 in which said first amplifier means includes feedback resistor means connected between its input and output for varying the feedback resistor value to produce similar ranges of proportional voltages for each of said current output computing elements.

8. The analog computer system of claim 5 in which said first amplifier means comprises a first amplifier having means for connecting a selected one of a plurality of feedback resistors in parallel with said first amplifier to provide similar ranges of said proportional voltages as predetermined ones of said current output computing elements are connected to said readout means, and in which said second amplifier means includes a plurality of series resistors each connected in circuit therewith having resistance values corresponding to said plurality of feedback resistors for producing a plurality of currents each equal in magnitude and direction to the applied currents from a predetermined one of said current output computing elements.

9. The analog computer system of claim 5 in which said first amplifier means comprises a first amplifier having a first feedback resistor connected between its output and input and in which said second amplifier means comprises a second amplifier having (1) a second feedback resistor, (2) an input resistor connected in circuit with the input thereof, and (3) an output resistor connected in circuit with the output thereof, said resistors having resistance values in accordance with the equation $$\frac{\text{first feedback resistor} \times \text{second feedback resistor}}{\text{output resistor} \times \text{input resistor}} = 1$$

10. The analog computer system of claim 5 in which there is provided a voltage readout device connected to the output of said first amplifier means for indicating the value of said proportional voltage.

11. The analog computer system of claim 5 in which there is provided a digital voltmeter connected to the output of said first amplifier for digitally indicating the value of said proportional voltage.

12. An analog computing system including a plurality of computing elements capable of being interconnected in accordance with a desired program to form a closed-loop feedback computing circuit, at least one of said computing elements being a current output computing element, and selected means for interconnecting selected ones of said computing elements, said system comprising:

switch means included in said selected interconnecting means and connected in circuit therewith for normally directly connecting an output of each current output computing element to the next respective element, readout means for producing from an applied current a proportional voltage and for providing at an output a current equal in magnitude and direction to said applied current, and means for operating said switch means to connect said output of a current output computing element to said readout means and to connect said output of said readout means to said next respective stage for maintaining said closed-loop and for producing a readout voltage porportional to said applied current without changing the condition of said computing element.

13. An analog computing system having a plurality of computing elements capable of being interconnected in accordance with a desired program which elements may be placed in a Hold mode, at least one of said computing elements being a current output computing element, and selected means for interconnecting selected ones of said computing elements, said system comprising:

switch means included in said selected interconnecting means for normally directly connecting the output of said current output computing element to the next succeeding element, first amplifier means for producing from an applied current a proportional voltage, second amplifier means connected to the output of said first amplifier means for providing at an output thereof a current equal in magnitude and direction to said applied current, means for operating said switch means during said Hold mode (1) to disconnect said current output computing element from said next succeeding element for connecting it to said first amplifier means and (2) to connect said output of said second amplifier means directly to the input of said next succeeding element, and a readout device connected to the output of said first amplifier means for indicating a readout voltage proportional to said applied current upon operation of said switch means without changing the solution of said computing elements.

References Cited

UNITED STATES PATENTS

| | | | |
|---|---|---|---|
| 2,728,524 | 12/1955 | Neher | 235—184 |
| 2,966,672 | 12/1960 | Horn | 340—147 |

OTHER REFERENCES

Proceedings of the Institute of Electrical Engineers, "Electronic-Analogue-Computer Study of Synchronous-Machine Transient Stability," April 1957, pp. 152–159.

MALCOLM A. MORRISON, *Primary Examiner.*

T. J. PAINTER, *Assistant Examiner.*